Aug. 18, 1953 J. R. DAVEY 2,649,504

ELECTRONIC SUBSCRIBER'S LOOP TELEGRAPH REPEATER

Filed July 12, 1950

INVENTOR
J. R. DAVEY
BY John E. Cassidy
ATTORNEY

Patented Aug. 18, 1953

2,649,504

UNITED STATES PATENT OFFICE 2,649,504

ELECTRONIC SUBSCRIBER'S LOOP TELEGRAPH REPEATER

James R. Davey, New York, N. Y., assignor to Bell Telephone Laboratories, Incorporated, New York, N. Y., a corporation of New York Application July 12, 1950, Serial No. 173,442

10 Claims. (Cl. 178—73)

This application pertains to telegraph repeaters and more particularly to an improved electronic hub-type subscriber loop telegraph repeater.

Acknowledgement is made of patent application Serial No. 123,366 by W. T. Rea, filed October 25, 1949, now Patent No. 2,594,993, which discloses an electronic hub-type subscriber loop telegraph repeater. The present telegraph repeater represents an improvement over that repeater in that:

(1) The signals from the subscriber are received on a voltage basis rather than a current basis. This eliminates the necessity of balancing the capacity of a cable loop in order to prevent kick-off during transmission of signals from the central office. Kick-off tends to occur only during transmission into an inductive loop and can be prevented by including a shunting capacitance in the loop pad circuit.

(2) From the plate of a pentode tube, square wave, rather than peaked wave, current signals are sent into the loop. This results in near zero bias transmission and in a reduction in noise induced in adjacent loop conductors.

(3) During reception of signals from the subscriber, the loop capacitance is discharged on a constant current, rather than a constant voltage basis. This causes the loop capacitance to be discharged during a spacing signal at least as quickly as it charges during a marking signal, and hence no inductive loop loading is required at the subscriber station or elsewhere. Although the loop current falls slowly during a spacing signal, the voltage at the head of the loop, which is used to control the received signal, decreases rapidly.

(4) Feedback from the loop circuit to the screen circuit of the driving pentode is employed to insure that the transitions of the signals sent into the loop are symmetrical. Thus bias is avoided in the outgoing signals.

A feature of the invention, therefore, is an electronic telegraph hub subscriber loop circuit in which the signals are received from the subscriber on a voltage rather than on a current basis.

Another feature of the invention is a pentode employed to transmit square wave, rather than peaked wave, signals into the loop. This reduces the noise induced in adjacent loop conductors and the symmetry of the square wave signals results in zero bias transmission to the subscriber station.

Another feature of the invention is that when receiving signals from the loop, the loop capacitance is discharged on a constant current rather than a constant voltage basis, so that the loop capacitance is discharged during a spacing signal at approximately the same rate as it charges during a marking signal. This eliminates the need for loop loading since, even though the loop current falls slowly at a mark-to-space transition, the voltage at the head end of the loop, which controls the received signals, falls rapidly; thus the bias effect found in current operated repeaters caused by prolongation of the marking signal current at a mark-to-space transition is eliminated.

Another feature of the invention is the employment of feedback from the loop to the screen circuit of the driving pentode to insure that the transitions of the signals sent into the loop are symmetrical and thus to avoid bias in the signals to that loop.

These and other features of the invention will become apparent from the following description when read with reference to the associated drawing which taken together represent a preferred embodiment in which the invention is presently incorporated.

Figures 1, 2, 3:
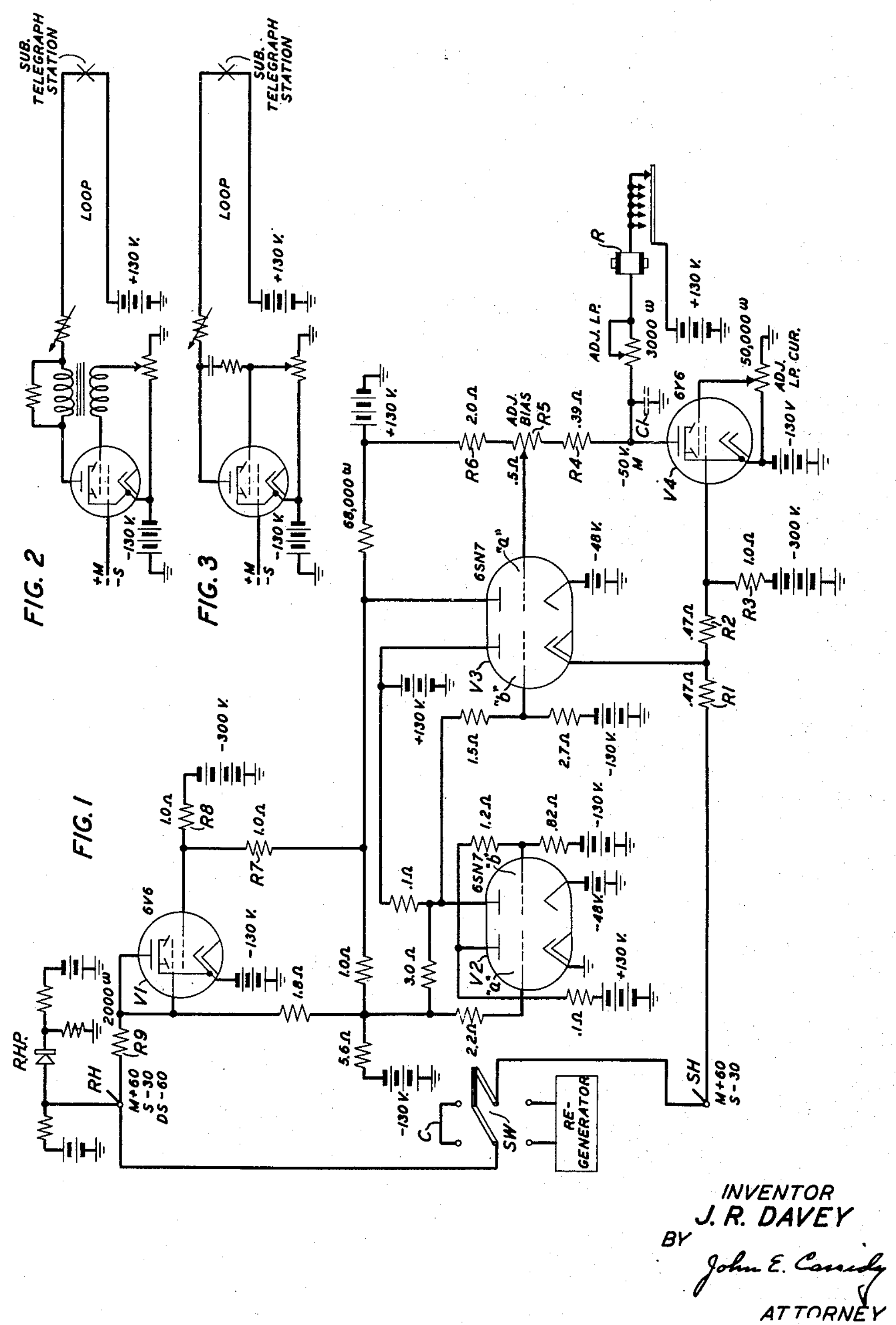
Fig. 1 shows an electronic hub-type subscriber loop telegraph repeater.
Figs. 2 and 3 show modifications of a portion of Fig. 1.

It is to be understood, however, that the invention is not limited to incorporation in the present embodiment and that it may be incorporated in other embodiments which will be suggested to those skilled in the art by the following. The codes of a set of tubes and the values of voltages and of resistances employed in the preferred embodiment are shown on the drawing. It is to be understood, also, that the invention is not limited to use of these particular tubes nor to the voltage or resistance values employed in the preferred embodiment.

Refer now to Fig. 1 of the drawing which shows the improved electronic hub-type subscriber loop telegraph repeater of the present invention. At the left of the drawing is shown the hub. A regenerative repeater may or may not be employed as required. If a regenerative repeater is not required, the hub electrically is a single point to which the receiving leg and the sending leg of each individual repeater in a particular hub concentration group are joined in parallel. There may be any number from two to ten or more such repeaters joined to the electrical hub point. Since regenerative repeaters are frequently required the hub is separated into a receiving hub RH and a sending hub SH. The receiving hub RH and the sending hub SH are arranged to be interconnected by means of a switch SW either through a conductor C when the regenerator is not required or through a regenerator of any of a number of forms, well known in the art, including an electronic regenerative repeater, when regeneration is required.

Only one electronic loop repeater with its single individual receiving leg and its single individual sending leg is shown in the drawing. The receiving leg is connected to the receiving hub RH and the sending leg to the sending hub SH.

In order to obtain the desired potential swings on the hub for the various signaling conditions, it has been found desirable to employ a potentiometer at the hub point. This is shown at the upper left and since it is associated with only the receiving hub when a regenerator is employed, it has been termed the receiving hub potentiometer RHP. One or more polarity discriminating resistances are connected with the elements of the potentiometer which may have any one of a number of configurations to afford the desired voltage swings.

The circuit to be described is arranged for half duplex operation in the sense that transmission is possible from the receiving leg of any one repeater in the concentration of the sending legs of all of the other repeaters simultanously. More than one repeater, however, may not transmit simultaneously through the single hub so that their signals will be unmutilated.

Signals on the send hub SH are connected to the grid of tube V4 by means of potentiometer string R1, R2, R3. Tube V4 thus conducts for the marking condition and is cut off for the spacing condition on signals transmitted from the hub toward the loop. During mark a loop current of 62.5 milliamperes flows through the tube. The resistance of the loop is adjusted so that the potential at the plate of V4 is −50 volts. The screen voltage of V4 is adjusted so the plate current will be 62.5 milliamperes under this condition of plate voltage. It is to be understood that the conditions prevailing during the intervals while the circuits are idle, as well as during the transmission of a marking signal from the hub toward the station in the loop and from the station in the loop toward the hub are identical. During the transmission of a spacing signal from the hub toward the station in the loop, the loop current falls to zero and the voltage at the plate of V4 rises to +130 volts.

When the loop is opened at the subscriber station to send a spacing signal, from the station in the loop, to the hub at the central office, the voltage at the plate of V4 falls to nearly −130 volts since V4 will normally be in a conducting condition. It will be observed that −130 volts is connected to the cathode of tube V4 and +130 volts is connected to its anode, through resistors R6, R5 and R4 the total magnitude of which is 2.89 magohms. The direct-current resistance of tube V4 when activated, as it is presently, is low relative to 2.89 megohms, so that the potential of the anode of tube V4, when a spacing signal is transmitted from the station in the loop to the hub at the central office, is substantially that of its cathode or −130 volts. Resistors R4, R5 and R6 connected to +130 volt battery constitute a high impedance power source. This voltage swing from −50 volts mark to −130 volts space is coupled to the grid of V3*a* by means of potentiometer string R4, R5, R6. Tube V3*a* thus conducts for mark or for a space toward the subscriber but cuts off for a space from the subscriber. The plate of V3*a*, therefore, swings positive for a space from the subscriber and this swing is coupled to the grid of V1 by means of potentiometer R7, R8. Tube V1, which has its cathode connected to −130 volts, conducts during this space condition and draws a current of 20 milliamperes through resistor R9 from the receiving hub potentiometer circuit RHP. The hub voltage is thus lowered from the marking value of +60 volts to the spacing value of −30 volts. Since the receive and send hubs are connected together either directly or through a regenerative repeater in half duplex service, it is necessary to prevent the space which appears on the hub as a result of an open loop from reaching the grid of V4 and interrupting the space condition toward the hub. This is accomplished by means of tube V2 and tube V3*b*. The grid of tube V2*a* is fed from three sources: the plate of V1 which swings negative to transmit a space to the receive hub, the plate of V3*a* which swings positive for a space from the loop, and the plate of V2*b*. The effective swing from V3*a* is made nearly twice that from V1. When a space is sent from the loop the net effect at the grid of V2*a* is a positive swing which causes conduction. The resulting negative swing at the plate of V2*a* is coupled to the grid of V2*b* and produces a cut-off condition in that half of the tube. This causes a positive swing at the plate of V2*b* which serves to hold the grid of V2*a* in a positive condition even after the completion of the spacing interval. The positive swing at the plate of V2*b* is also coupled to the grid of V3*b*. The cathode of this triode is connected to the junction of resistors R1 and R2 and is arranged to hold that point at the normal mark voltage regardless of the voltage on the sending hub. A space from the subscriber is thus prevented from coming back to tube V4 even if it has been delayed in passage through a regenerative repeater.

When a space occurs on the receive hub from some other connecting repeater, the plate of V1 swings negative without any opposing positive swing from V3*a*. This causes V2*a* to cut off and consequently V2*b* to conduct. The resulting negative swing of the plate of V2*b* serves to hold V2*a* cut off after the completion of the spacing interval. The negative swing of the plate of V2*b* also keeps V3*b* cut off even for a space condition at the junction of R1 and R2 and thus signals on the send hub may pass through V4 to the loop.

This circuit has the usual break features necessary for a loop repeater. If the subscriber loop is closed at the time of arrival of an incoming break at the hub point, the transmission path from the send hub to V4 is immediately cleared and the loop opened. If the loop is open at the time the break arrives at the hub, the path of V4 is not cleared until the loop is closed. Once V4 is cut off it becomes impossible to cut off tube V3*a* by opening the loop at the subscriber station. The subscriber may send a break by opening the loop whereupon, if V4 is conducting, V3*a* cuts off and the break is transmitted to the hub. At the same time V4 is held marking thus preventing interruption of the break. If V4 is cut off at the time of initiation of the break, the break is not passed to the hub until V4 becomes conducting.

Attention is called to the fact that in sending from the subscriber station, as the transmitting contacts are opened and closed, signals are received at the central station as a result of changes in voltage rather than changes in current. The potential at the anode of tube V4 is −50 volts for marking and approximately −130 volts for spacing. This voltage swing is applied through the V3*a* tube grid resistor string R4, R5 and R6 to cause it to conduct for marking and cut off for spacing.

In the usual practice, signals from the loop are received at the central station by means of a magnetic polar relay having a line winding and a balancing winding. With such an arrangement it is necessary to prevent false operation of the relay, or "kick-off" as it is called, when signals are transmitted toward the subscriber station. Kick-off on capacitative loops is caused by the discharge of the charged line capacity back through the line winding on a mark-to-space signal transition. In order to prevent it various methods have been followed, all of which involve the addition of condensers and their arrangement in a manner to produce a discharge which balances or counteracts that of the line capacity. When, as in the present arrangement, signals are transmitted from the subscriber station on a voltage rather than a current basis, the current responsive polar relay is not employed and there is no capacity kick-off problem to be dealt with.

There is a problem encountered in the present arrangement, however, when the subscriber loop is inductive rather than capacitative in character. Most loops are capacitative so the condition is met in a small percentage of cases. However, when the loop is inductive and transmission is from the central station to the subscriber station, on a transition from spacing to marking the voltage of the anode of tube V4 is required to swing from +130 volts when tube V4 is cut off to approximately −50 volts when tube V4 conducts. Under both of these conditions tube V3*a* is supposed to remain conducting in order to prevent the transmission of a spacing signal element to the receiving hub and out over the system. An inductive loop delays the build-up of the marking current and during the build-up period the potential at the anode of tube V4 may fall sufficiently negative to cut off tube V3*a* momentarily and transmit a short spacing pulse to the hub. In effect it is analogous to kick-off of an electromagnetic receiving relay.

The above-described short false space effect may be prevented by connecting the condenser C1 between the anode of tube V4 and ground which tends to neutralize the effect of an inductive loop. The condenser C1 prevents the potential of the anode of tube V4 from going sufficiently negative to cut off tube V3*a*. The condenser C1 is required only when the loop is inductive.

As mentioned in the foregoing, employment of a pentode tube as the sending element into the loop results in the transmission of current waves which are essentially square. This is due to the anode current versus plate potential characteristic of a pentode. Beyond the knee of the current versus plate potential characteristic, the current rises only slightly above the horizontal over a considerable voltage range. As a result of this, the tops of the signal waves are relatively flat rather than peaked at the mark-to-space transition which would result in marking signal bias and in greater noise induced in adjacent loop conductors.

In the case of a magnetic relay subscriber loop repeater in which the opposing ends of the loop through the operating winding of the receiving relay may be terminated in batteries of opposite polarities for markng, when the loop is opened at the subscriber station, for the transmission of a spacing signal, the loop current in a capacitative loop falls relatively slowly as the capacitance discharges. When the loop is closed again at the subscriber station for the transmission of a marking signal, the current flows into the loop quickly to charge up the capacitance. The effect of the delay of a mark-to-space transition relative to that of a space-to-mark transition is to shorten the spacing interval. To counteract this, inductive loading is employed to equally delay the space-to-mark transition.

In the present electronic repeater no inductive loading is required in a capacitative loop as the capacitative line discharge is on a constant current instead of an exponential basis. When signals are transmitted from the loop toward the central station, on a mark-to-space transition the die-away of the voltage at the plate of tube V4 is relatively steep. There is no protracted delay as in the discharge of a capacitative line on an exponential basis. When the loop is again closed for the transmission of a marking signal the voltage at the anode of tube V4 rises quickly, but there is no need to delay the rise, by means of inductive loading, since the fall of voltage on the mark-to-space transition was correspondingly fast. Therefore, no inductive loading of a capacitative loop is required in the present invention to compensate for shortened spacing intervals characteristic of the usual magnetic relay receiving element in the usual repeater.

Although the current versus plate potential characteristic of a pentode tube is relatively flat beyond the knee of the curve over a wide range of potential, there is nevertheless a small rise from the horizontal in the current curve as the voltage increases. From the foregoing description it is apparent that in transmitting from the central station to the loop, on a transition from spacing to marking, the potential of the anode of tube V4 is +130 volts at the instant the spacing signal terminates, and that it changes to −50 volts shortly thereafter, and remains at this level throughout the interval of transmission of the marking signal element. At the beginning of the marking signal interval, while the potential of the plate of pentode V4 is at +130 volts, and until it falls shortly thereafter and remains at the −50-volt level, there will be a small current peak, dependent on the pentode V4 current versus plate potential characteristic. This peak may be flattened, with a consequent reduction in signal distortion, by the arrangement of Fig. 2 which shows a modification of a portion of Fig. 1 in which a transformer is added, having a primary winding in series with the anode of tube V4 and the line, and a secondary winding in the screen grid circuit.

With such a transformer, on a space-to-mark transition, as the plate current in tube V4 rises it causes a decrease in screen voltage. This tends to limit or flatten the overshoot of current at the beginning of the marking interval. As soon as the current curve is flattened the transformer has no further effect until the end of the marking interval on the mark-to-space transition. On this transition as the marking current falls in the primary winding, the potential of the screen grid is increased momentarily by the secondary winding. This, however, is without either beneficial or adverse effect except that it makes it only slightly more difficult to cut off tube V4 at the beginning of the spacing interval.

A similar compensating effect is obtained by capacity coupling between the plate and screen circuits of the pentode as shown in Fig. 3. The decrease of plate potential on a space-to-mark transition causes a decrease in screen potential and prevents the current from overshooting the steady state current condition. Since the plate potential wave in a long loop is not a square wave (as is the current wave) this method of Fig. 3 is somewhat inferior to the method of Fig. 2. It is, however, to be preferred from the standpoint of simplicity and size of equipment.

What is claimed is:

1. An electronic subscriber loop direct-current telegraph hub repeater and control circuit comprising a loop transmission conductor, a first space discharge device which transmits toward the loop, an output circuit for said device, a second space discharge device which transmits direct-current signals toward the hub, and an input circuit for said second device, said conductor connected directly to a junction between said input and said output circuits.

2. An electronic subscriber loop direct-current telegraph hub repeater and control circuit having a hub, a loop conductor, a first space discharge device which transmits direct-current signals toward said hub, an input circuit for said device, a second space discharge device which transmits toward said loop conductor, an output circuit for said second device and a direct junction with said loop conductor, intermediate said input and said output circuits.

3. An electronic subscriber loop direct-current telegraph hub repeater and control circuit having a sending hub and a receiving hub, a branch extending from said sending hub to the input of a sending space discharge device, an output of said device connected directly to the loop conductor of a subscriber loop circuit, means for transmitting signals from said sending hub through said device, means responsive thereto for transmitting signals directly through said loop circuit, a receiving space discharge device having an input connected to said loop and an output connected to said receiving hub, for transmitting dirtct-current signals toward said hub, and elements in said receiving device connected to said sending device so that said receiving device is controlled jointly by potentials applied from said sending device and from said loop.

4. An electronic subscriber loop direct-current telegraph hub repeater and control circuit having a hub, a loop transmitting conductor terminated in a very high impedance power source, a receiving signal space discharge device for receiving direct-current signals from said loop conductor and transmitting said signals toward said hub, an input electrode for said device connected directly to said source so that said device is controlled by voltage changes across said power source generated directly by opening and closing the loop and means responsive to the activation and inactivation of said device for impressing a first and a second potential signal condition on said hub.

5. An electronic subscriber loop direct-current telegraph hub repeater and control circuit comprising a hub and a subscriber loop and station circuit, a space discharge device in said repeater circuit, said device having an output circuit connected to said loop for transmitting into said loop, means, comprising a connection from said hub to an input circuit of said device, for impressing potential changes on said device, means responsive to said potential changes for transmitting current signals directly into said loop and to said station circuit, said signals characterized by a departure from flatness at steady state level near transition points of said signals and a feedback circuit comprising a branch having an electrical energy accumulating element interconnecting said output circuit to a control electrode in said device to tend to flatten said signals.

6. In a telegraph system, a telegraph repeater station, a telegraph subscriber station, a telegraph loop circuit interconnecting said stations, a space discharge device at said repeater station, an output of said device connected in series with said loop for transmitting signals to said loop, a control electrode in said device, and a feedback circuit interconnecting said output to said electrode to modify the characteristic signals transmitted by said device to said loop, said feedback circuit comprising an electrical energy accumulator feedback element.

7. A system in accordance with claim 6 having a transformer as the feedback element, said transformer having a primary winding connected in series with said loop and a secondary winding connected to said electrode.

8. A system in accordance with claim 6 having a condenser and a resistance in series, interconnecting said loop and said electrode as the feedback elements.

9. A signal transmitter, a reactive transmission circuit, said circuit of relatively low impedance, said transmitter comprising a non-linear electron tube signal generator, said tube a pentode, said tube having a very high differential impedance relative to said circuit, a current source connected to said tube, means connected to said transmitter for initiating and cutting off a flow of current from said source through said impedance of said generator and said impedance of said transmission circuit in series, so as to transmit substantially unbiased signals over said circuit.

10. In a signaling system, a capacitative transmission circuit of relatively low impedance, a signal transmitter in said circuit, means in said transmitter for transmitting current and no-current signals over said circuit, a high impedance power source, said source comprising a source of potential, a very high lumped impedance, relative to the impedance of said transmission circuit, and the output circuit of a first space discharge device connected in series, said transmission circuit terminated in said source, a second space discharge device signal receiver for receiving said current and no-current signals, said second device having an input circuit connected to said high impedance source, said second device responsive to the potentials across said source.

JAMES R. DAVEY.

References Cited in the file of this patent

UNITED STATES PATENTS

| Number | Name | Date |
|---|---|---|
| 1,852,050 | Hamilton | Apr. 5, 1932 |
| 2,444,782 | Lord | July 6, 1948 |
| 2,508,879 | Zagor | May 23, 1950 |
| 2,528,120 | Davey | Oct. 31, 1950 |